US012709549B2

(12) United States Patent
Plissonneau et al.

(10) Patent No.: US 12,709,549 B2
(45) Date of Patent: Aug. 18, 2026

(54) CERIUM BASED PARTICLES, PROCESS FOR PRODUCING THE SAME AND USES THEREOF IN POLISHING

(71) Applicant: RHODIA OPERATIONS, Lyons (FR)

(72) Inventors: Marie Plissonneau, Paris (FR); Réka Toth, Paris (FR); Thierry Le Mercier, Rosny-sous-Bois (FR); Valérie Buissette, Paris (FR); Manabu Yuasa, Tokushima (JP); Eisaku Suda, Tokushima (JP)

(73) Assignee: RHODIA OPERATIONS, Lyons (FR)

( * ) Notice: Subject to any disclaimer, the term of this patent is extended or adjusted under 35 U.S.C. 154(b) by 801 days.

(21) Appl. No.: 17/780,469

(22) PCT Filed: Nov. 25, 2020

(86) PCT No.: PCT/EP2020/083304
§ 371 (c)(1),
(2) Date: May 26, 2022

(87) PCT Pub. No.: WO2021/105174
PCT Pub. Date: Jun. 3, 2021

(65) Prior Publication Data

US 2023/0041600 A1 Feb. 9, 2023

(30) Foreign Application Priority Data

Nov. 26, 2019 (EP) .................................... 19306525

(51) Int. Cl.
*C01F 17/206* (2020.01)
*C01F 17/32* (2020.01)
(Continued)

(52) U.S. Cl.
CPC ................ *C01F 17/32* (2020.01); *C09G 1/02* (2013.01); *B82Y 30/00* (2013.01);
(Continued)

(58) Field of Classification Search
CPC .......... C09G 1/02; C01F 17/206; C01F 17/32; C01P 2004/03; C01P 2004/51;
(Continued)

(56) References Cited

U.S. PATENT DOCUMENTS

| | | | |
|---|---|---|---|
| 4,657,644 | A | 4/1987 | Bachot et al. |
| 2013/0109600 | A1 | 5/2013 | Reed et al. |

(Continued)

FOREIGN PATENT DOCUMENTS

| | | | |
|---|---|---|---|
| FR | 2570087 | A1 | 3/1986 |
| WO | 2008043703 | A2 | 4/2008 |
| WO | 2010020466 | A1 | 2/2010 |

OTHER PUBLICATIONS

KR 20170073858A Translation (Year: 2017).*

(Continued)

*Primary Examiner* — Shuangyi Abu Ali
(74) *Attorney, Agent, or Firm* — Osha Bergman Watanabe & Burton LLP

(57) ABSTRACT

The disclosure relates to cerium based particles having a rough surface and their use as a component of a polishing composition, especially for chemical mechanical polishing. The cerium based particles have substantially the shape of polyhedrons which have one or more faces with protrusions thereon, said protrusions being integrally formed with said cerium based particles. The present disclosure also relates to the method of preparation of the cerium based particles.

19 Claims, 4 Drawing Sheets

(51) Int. Cl.
*C09G 1/02* (2006.01)
*B82Y 30/00* (2011.01)

(52) U.S. Cl.
CPC ...... *C01P 2004/51* (2013.01); *C01P 2004/62* (2013.01); *C01P 2004/64* (2013.01)

(58) Field of Classification Search
CPC .............. C01P 2004/62; C01P 2004/64; C01P 2006/12; C01P 2006/40; C09K 3/1463; B82Y 30/00
See application file for complete search history.

(56) References Cited

U.S. PATENT DOCUMENTS

2015/0072522 A1* 3/2015 Jung .................... C09K 3/1409 438/669
2016/0272860 A1 9/2016 Mizoguchi et al.
2016/0312069 A1 10/2016 Suda et al.
2017/0152421 A1 6/2017 Ohtake et al.
2019/0211245 A1 7/2019 Choi et al.
2020/0198982 A1* 6/2020 Suda .................... C09K 3/1436
2024/0247169 A1 7/2024 Plissonneau et al.

OTHER PUBLICATIONS

International Search Report issued in corresponding Application No. PCT/EP2020/083304 dated May 2, 2021, (3 pages).
Written Opinion of the International Searching Authority issued in corresponding Application No. PCT/EP2020/083304 dated May 2, 2021, (6 pages).
Stephen Brunauer, P. H. Emmett, Edward Teller—Adsorption of Gases in Multimolecular Layers—J. Am. Chem. Soc. 1938, 60, 2, 309-319—doi: 10.1021/ja01269a023.
Office Action issued in corresponding U.S. Appl. No. 17/780,462 mailed on Aug. 1, 2024 (20 pages).

* cited by examiner

CERIUM BASED PARTICLES, PROCESS FOR PRODUCING THE SAME AND USES THEREOF IN POLISHING

This application is a national stage entry of International Patent Application No. PCT/EP2020/083304, filed on Nov. 25, 2020, which claims priority to European Patent Application No. 19306525.7, filed on 26 Nov. 2019, the whole contents of these applications being incorporated herein by reference for all purposes.

TECHNICAL FIELD

The present invention relates to cerium based particles, to a process for producing the same and to their use as a component of a composition for polishing, especially for chemical mechanical polishing.

BACKGROUND ART

Ceric oxides are commonly used for polishing applications. The development of the electronics industry requires an increasingly considerable use of compositions for polishing various parts such as discs or dielectric compounds. These compositions, which are usually commercialized in the form of dispersions, must exhibit a certain number of characteristics. For example, they must offer a high degree of removal of material, which reflects their abrasive capacity. They must also have a defectuosity which is as low as possible; the term "defectuosity" is intended to mean in particular the amount of scratches exhibited by the substrate once treated with the composition. For reasons of stability and of ease of use, these dispersions usually comprise particles of submicronic dimensions, i.e. generally less than 300 nm. In addition, the presence of particles that are too fine in these dispersions reduces their abrasive capacities, and particles that are too large can contribute to an increase in the defectuosity.

Attempts have been made to improve the abrasive properties of the particles used in polishing compositions. For instance, US 2015/0072522 describes cerium oxide abrasive particles wherein small auxiliary particles have been formed on the surface of bigger mother particles. However, such auxiliary particles may detach from the mother particles during the polishing process; it may result in an increase of the defectuosity of the polished substrate; the detached auxiliary particles may also stick to the substrate even after several washing steps. It would result in unacceptable costs due to the substrate loss and the recurrent polishing composition replacement.

In this context, we believe that there is a need for cerium based particles having improved abrasive properties without the above mentioned disadvantages.

There is also a need for a making process of improved cerium based particles which is simple and easy to implement at an industrial scale.

BRIEF DESCRIPTION OF THE INVENTION

These problems are solved by the present invention which offers inter alia new cerium based particles exhibiting a rough surface, as well as a process for making the same.

One object of the invention thus relates to cerium based particles having substantially the shape of polyhedrons which have one or more faces with protrusions thereon, said protrusions being integrally formed with said cerium based particles.

The invention also relates to dispersions of the above-disclosed particles in a liquid medium.

Another object of the invention relates to a process for producing such cerium based particles, comprising the following steps:

(a) contacting, under an inert atmosphere, an aqueous solution of a base and an aqueous solution comprising $NO_3^-$, $Ce^{III}$, optionally $Ce^{IV}$, optionally $M^{n+}$ with M a metal of valence n, wherein the difference between the base/total (Ce+optional M) molar ratio and the $NO_3^-/Ce^{III}$ molar ratio is lower than 2;

(b) subjecting the mixture obtained in step (a) to a thermal treatment, wherein the temperature is comprised between 55° C. and 75° C.;

(c) optionally acidifying the mixture obtained in step (b);

(d) optionally washing with water the solid material obtained at the end of step (b) or (c);

(e) optionally subjecting the solid material obtained at the end of step (d) to a mechanical treatment to deagglomerate the particles.

The invention also relates to the cerium based particles and dispersions thereof susceptible to be obtained by this process.

The cerium based particles and dispersions of the invention can advantageously be used to prepare polishing compositions, especially adapted to CMP applications.

Advantageously, the rough surface of the particles of the invention increases their surface specific area by comparison with smooth-surfaced cerium oxide particles. Accordingly, by increasing the contact surface between the particles and the substrate to be polished, the abrasive properties of the rough-surfaced particles of the invention are improved, allowing to advantageously use them in a chemical mechanical polishing process. By comparison with smooth-surfaced cerium oxide particles of equivalent sizes, the rough-surfaced particles of the invention allow higher removal rate while maintaining a low defectuosity thanks to appropriate size distributions.

Contrary to cerium oxide particles having auxiliary particles formed on the surface of mother particles such as the ones disclosed in US 2015/0072522, the protrusions forming the rough surface of the particles of the invention are integrally formed therewith. Over a certain period of use in a polishing process, the surface of the particles of the invention may possibly erode but cannot be removed like auxiliary particles. Advantageously, the particles of the invention have a longer lasting use and minimize the manufacturing wastes by the end users.

FIGURES

Figure 1:
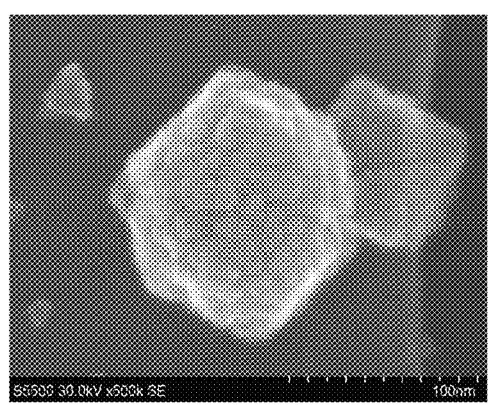
FIGS. 1 to 5 are SEM pictures of particles according to the invention respectively obtained by examples 1, 2, 3, 5 and 6.

The SEM images were obtained with a SEM S-5500 of Hitachi High Technologies Corporation. The TEM images were obtained with a TEM JEOL JEM 1400 120 kV with a Gatan camera: Orius 2k-2k.

Definitions

In the present disclosure, the expression "comprising one" or "having one" should be understood as meaning "comprising at least one".

The expression "comprised between . . . and . . . " should be understood as including the limits.

The term "cerium based" in connection with the particles of the invention refers to particles of cerium oxide or of a mixed oxide of cerium and of at least one metal (M) other than cerium. Such mixed oxide may also denote, in some embodiments, a solid solution. In that case, the metal (M) atoms are intimately diffused into the cerium oxide crystalline structure.

Cerium oxide generally has a purity degree of at least 99.8% by weight with respect to the weight of the oxide. Cerium oxide is generally crystalline ceric oxide. Some impurities, other than cerium and said at least one metal (M), may be present in the oxide. The impurities may stem from the raw materials or starting materials used in the process of preparation of the cerium based oxide. The total proportion of the impurities is generally lower than 0.2% by weight with respect to the cerium based oxide. Residual nitrates are not considered as impurities in this application.

The expression "dispersion" in connection with dispersions of cerium based particles denotes a system consisting of solid fine cerium based particles of submicronic dimensions, stably dispersed in a liquid medium, it being possible for said particles to also optionally contain residual amounts of bound or adsorbed ions such as, for example, nitrates or ammoniums.

Different parameters may be used to characterize the sizes and the distribution of sizes of the particles of the invention.

In connection with dispersions of the particles:

- the average size of n (>100) particles may be measured using a photograph of dispersions thereof obtained by SEM (scanning electron microscopy);
- the standard deviation mentioned in the present application is also determined from the SEM method. It has its usual mathematical meaning. It is the square root of the variance and is expressed by the formula:

$$\sigma = \sqrt{\frac{1}{n}\sum_{i=1}^{n}(x_i - \overline{x})^2}$$

- n being the number of particles taken into account in the measurement,
- $x_i$, being the size of a particle i,
- $\overline{\chi}$ being the average value of the size of the particles ($1/n\ \Sigma_i x_i$)

In connection with particles in the powder form (dried particles), the specific surface area may be determined on a powder by adsorption of nitrogen by the Brunauer-Emmett-Teller method (BET method). The method is disclosed in standard ASTM D 3663-03 (reapproved 2015). The method is also described in the periodical "The Journal of the American Chemical Society, 60, 309 (1938)". The specific surface area may be determined automatically with an appliance TriStar 3000 of Micromeritics according to the guidelines of the constructor. Prior to the measurement, the samples in the form of powders shall be degassed under static air by heating at a temperature of at most 210° C. to remove the adsorbed species.

The distribution of sizes of the particles may be characterized by various parameters. Said parameters are based on distributions by volume and not by number:

- the hydrodynamic mean diameter Dh may be determined by dynamic light scattering (DLS). This technique allows measurement of the hydrodynamic mean diameter Dh of the solid objects, the value of which is affected by the presence of aggregates of particles. Therefore, the measurement is usually performed on a dispersion of the particles in water. Dh is determined with the appliance Zetasizer Nano-ZS of Marvern following the guidelines of the constructor. The sample usually needs to be diluted in deionized water. A dilution factor of ×30 000 may be applied;
- laser diffraction may also be used to determine the distribution of sizes of the particles. A laser particle sizer like Horiba LA-910 may be used following the guidelines of the constructor. For the measurement, a relative refractive index of 1.7 may be used. From the distribution in volume obtained by laser diffraction, various parameters usually used in statistics like D10, D50, D90 and dispersion index may be deducted.
- D10 is the diameter determined from a distribution obtained by laser diffraction for which 10% in volume of the particles have a diameter of less than D10.
- D50 is the median diameter determined from a distribution obtained by laser diffraction.
- D90 is the diameter determined from a distribution obtained by laser diffraction for which 90% in volume of the particles have a diameter of less than D90.
- The "dispersion index" is defined by the following formula $\sigma/m=(D90-D10)/2D50$.

DESCRIPTION OF THE INVENTION

Particles

The present invention relates to cerium based particles having substantially the shape of polyhedrons which have one or more faces with protrusions thereon, said protrusions being integrally formed with said cerium based particles.

First, the particles of the invention may be described as substantially polyhedral. The particles may be especially observed on pictures obtained by SEM (scanning electron microscopy). The observation of the pictures must be made with a magnitude and an appliance which makes it possible to identify clearly the shape of the particles. It is therefore preferable to clearly distinguish the particles individually. The magnitude used for the observation may for instance range from ×40 000 to ×500 000. A field emission-type SEM 5-5500 of Hitachi High Technologies Corporation may be used.

A polyhedral particle, in the framework of the invention, denotes a particle exhibiting, substantially, polygonal faces, straight edges and sharp corners. One particularity of the particles of the invention lies in the fact that, on images of a particle obtained by SEM, it is possible to discern the polyhedral shape of the particle by its visible edges and/or corners, despite the presence of protrusions on one or more of the particle faces.

Referring to their polyhedral shape, the cerium-based particles of the invention may in particular have substantially the shape of cubes, truncated octahedrons or a combination thereof.

Especially, when the observed particle has six faces consisting of six substantially square faces, it is referred to as a cube.

Respectively, when the observed particle has fourteen faces consisting of (i) six substantially square faces, and (ii) eight substantially hexagonal faces, it is referred to as a truncated octahedron.

"Substantially square" in connection with a particle face observed by SEM means that four edges having substantially the same length can be seen or easily guessed by connecting together the visible corners and/or edges. Moreover, the image is such that the adjacent edges of these four edges form an angle which is substantially equal to 90°. The angle formed by the adjacent edges of these four edges may be comprised between 88° and 92° or between 89° and 91°.

"Substantially hexagonal" in connection with a particle face observed by SEM respectively means that six edges having substantially the same length can be seen or easily guessed by connecting together the visible corners and/or edges. Moreover, the image is such that the adjacent edges of these six edges form an angle which is substantially equal to 120°. The angle formed by the adjacent edges of these six edges may be comprised between 118° and 122° or between 119° and 121°.

In addition to their polyhedral shape, the cerium based particles of the invention are also characterized by the fact that one or more of their faces have protrusions thereon. Protrusions will now be detailed in connection with one cerium-based particle according to the invention.

The protrusions may extend over a portion of at least one face, or of several faces, or even of each face, of a cerium-based particle.

Figure 3:
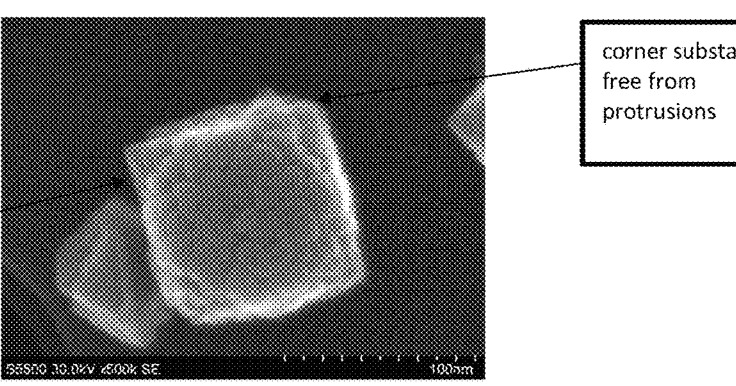
Figure 9:
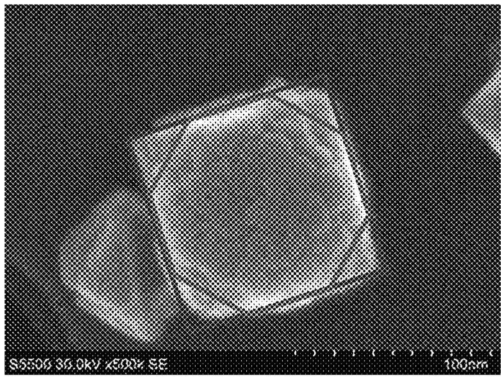
FIG. 9 is a schematized shape of the face of the particle of FIG. 3.

The protruded portion may be centered on the particle face. The protruded portion may extend radially from the center of the particle face. The protruded portion may especially extend radially from the center of the particle face to the edges of the particle face. The protrusions may in particular extend over at least 60%, at least 70%, at least 80%, in particular at least 90%, even at least 95%, of the surface of the particle face. It may be measured by any suitable method known by the skilled person, especially on a SEM picture, for instance according to the following method:

1) the geometric shape of the face is schematized on the picture: in the case of the particle of FIG. 3, as illustrated on FIG. 9, the face is schematized as a square.
2) the geometric shape of the protruded area of the face is then schematized on the same picture: in the case of the particle of FIG. 3, as illustrated on FIG. 9, the protruded area is schematized by a regular octagon.
3) the area of each schematized geometric shape is calculated. For instance, in the case of the particle of FIG. 9, the square has a side of length noted L: its area A is then equal to $A=L^2$. The octagon has a side of length noted 1: its area a is then equal to $\sigma=2l^2(1+\sqrt{2})$. As it can be measured directly on the picture, $l \approx 3/7L$: the calculated ratio a/A is consequently about 0.89. In other words, it can be considered that the protrusions extend over 89% of the surface of the particle face.

The cerium-based particle may have at least one edge portion and/or at least one corner being substantially free from protrusions (see eg FIG. 3).

Protrusions adjacent to each other may be spaced apart from each other or contact each other. According to one preferred embodiment, protrusions adjacent to each other contact each other.

Figure 10:
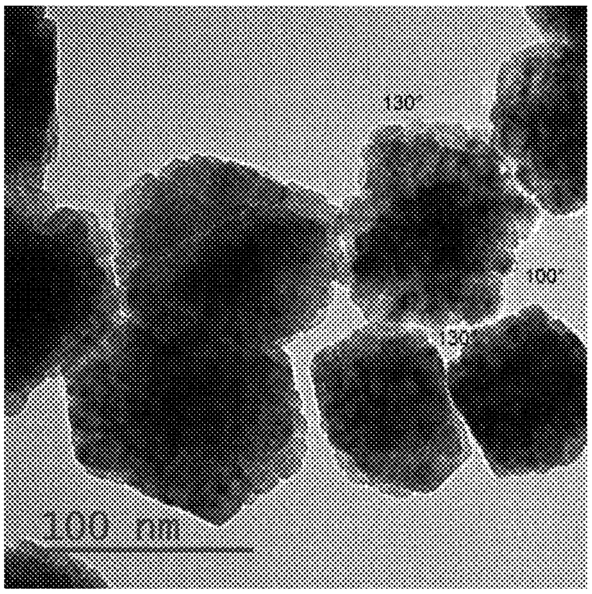
FIG. 10 is a view of the particles by TEM illustrating the blunt aspect of the protrusions thereof.

The protrusions may be blunt. By "blunt", it is meant a rounded shape: especially, the absence of sharp protrusions is advantageous when using the cerium-based particles as abrasive particles in a polishing application. It minimizes the occurrence of micro scratches on the polished substrate. The blunt aspect of the protrusions can be observed by microscopy, for instance on a TEM picture, as illustrated on FIG. 10: the sides of a blunt protusion together form a right or obtuse angle (i.e. ≥90° C.) on the picture. By comparison, a sharp protrusion would have sides forming together an acute angle (i.e. <90° C.).

According to one embodiment, a protruded face of a cerium-based particle may be described as having the surface aspect of a "cauliflower": the protrusions are blunt, contact each other and extend radially from the center of the particle face.

The number of protrusions per face of a cerium-based particle may be comprised between 2 and 200, in particular between 2 and 150, more particularly between 35 and 135. It may be defined as an average value calculated on the basis of at least one SEM picture, typically 2 pictures. Especially, when the cerium-based particle is a cube, the number of protrusions per cubic face may be comprised between 2 and 200 in particular between 2 and 150, more particularly between 65 and 135. Respectively, when the cerium-based particle is a truncated octahedron: the number of protrusions per cubic face may be comprised between 2 and 150, in particular between 2 and 120, more particularly between 20 and 60; the number of protrusions per hexagonal face may be comprised between 2 and 150, in particular between 2 and 120, more particularly between 30 and 100.

The average diameter of a protrusion may be comprised between 2 nm and 50 nm, in particular between 5 nm and 30 nm. It can be determined by measuring the diameters of a plurality of protrusions on at least one SEM picture, typically 2 pictures. A protrusion diameter may be defined as the average of the largest diameter and the smaller diameter measured for said protrusion.

The observation by SEM is made on a preferably high number of particles so that it is possible to perform a statistical analysis. This is usually accomplished on more than one picture of the same sample of the cerium-based particles. The number of particles for the observation may preferably be higher than 200. The particles retained are such that their faces are well visible on the picture(s). More particularly, the number of polyhedral particles retained corresponds to at least 80.0%, more particularly at least 90.0%, even more particularly at least 95.0% of the sampled particles. The average size of the particles of the present invention, as measured by SEM, may range from 10 nm to 200 nm, preferably from 30 nm to 150 nm, more preferably from 50 nm to 110 nm.

A cerium-based particle of the invention is also characterized by the fact that the protrusions extending on one or more of its faces are integrally formed with said particle. This feature notably results from the synthesis method according to the invention, which proceeds by a controlled precipitation method that enables to texturize the particles faces directly during one single precipitation step instead of aggregating smaller particles on a mother particle formed in separate stages, as proposed by the state of the art illustrated by US 2015/0072522. Thus, the protrusions in the framework of this invention can be seen as a textured surface of one integrally formed cerium-based particle. The protrusions improve the roughness of the cerium-based particles, which is advantageous when using the particles as abrasive particles in a polishing process. As explained above, contrary to auxiliary particles, integrally formed protrusions are not likely to detach from the cerium-based particles during the polishing process while notably improving the removal rate. This advantageous effect resulting from the feature according to which the protrusions are "integrally formed" with the particles of the invention can also be checked by applying ultrasound to a dispersion according to the invention in the conditions detailed in example 7, which enable to confirm by a microscopy observation the non-detachment of the protrusions.

The cerium-based particles of the invention may also have a specific composition. The cerium-based particles may in particular be made of cerium oxide, typically ceric oxide. The cerium-based particles may alternatively be made of a mixed oxide of cerium and at least one metal (M) other than cerium.

Said at least one metal (M) other than cerium may be more particularly chosen from the group consisting of transition metal elements, in particular rare earth elements, such as La, Pr and Nd; and alkaline earth metal elements, such as Sr. More preferably, said at least one metal (M) is chosen from the group consisting of lanthanum, praseodymium and neodymium. Even more preferably, said at least one metal (M) is lanthanum.

When the cerium-based particles are made of a mixed oxide of cerium and at least one metal (M), the molar ratio M/(M+Ce) may be comprised between 0.01 and 0.15, more particularly between 0.01 and 0.12, even more particularly between 0.01 and 0.04, especially between 0.02 and 0.03. In particular, when the cerium-based particles are made of a mixed oxide of cerium and lanthanum, the molar ratio La/(La+Ce) may be comprised between 0.01 and 0.15, more particularly between 0.01 and 0.12, even more particularly between 0.01 and 0.04, especially between 0.02 and 0.03.

Figure 5:
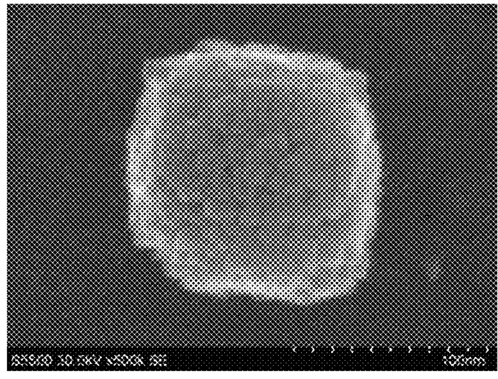

The cubic shape that may characterize some of the cerium-based particles of the invention may especially be obtained when the cerium-based particles are made of cerium oxide or of a mixed oxide of cerium and lanthanum (see e.g. FIGS. 3 and 5).

The truncated octahedral shape that may characterize some of the cerium-based particles of the invention may especially be obtained when the cerium-based particles are made of cerium oxide. (see e.g. FIG. 1).

The cerium-based particles may exhibit a specific surface area (BET) comprised between 16 and 55 $m^2/g$, more particularly between 17 and 50 $m^2/g$, even more particularly between 18 and 45 $m^2/g$, especially between 19 and 42 $m^2/g$. The determination by the BET method is specified above in the definitions section.

The cerium-based particles may also be characterized by various parameters in connection with their distribution of sizes.

The cerium-based particles may in particular exhibit a hydrodynamic mean diameter Dh comprised between 75 nm and 1000 nm, more particularly between 80 nm and 500 nm, even more particularly between 85 nm and 300 nm, especially between 90 nm and 240 nm. The hydrodynamic mean diameter Dh is determined by dynamic light scattering, as explained above in the definitions section.

Laser diffraction may also be used to characterize the cerium-based particles. The technique is detailed in the above definitions section. The cerium-based particles may thus exhibit at least one or any combinations of the following features:

- a median diameter D50 comprised between 70 nm and 200 nm, more particularly between 75 nm and 170 nm, even more particularly between 79 nm and 150 nm; and/or
- a diameter D10 comprised between 55 nm and 200 nm, more particularly between 60 nm and 150 nm, even more particularly between 65 nm and 110 nm; and/or
- a diameter D90 comprised between 80 nm and 300 nm, more particularly between 90 nm and 260 nm, even more particularly between 94 nm and 230 nm; and/or
- a diameter D99 comprised between 90 nm and 400 nm, more particularly between 100 nm and 385 nm, even more particularly between 107 nm and 370 nm; and/or
- a dispersion index 6/m lower than 0.60, particularly lower than 0.42, wherein $\sigma/m=(D90-D10)/2D50$; and/or
- a ratio D90/D50 comprised between 1.10 and 1.60.

The minimal values of Dh, D10, D50, D90, D99 may each be selected in the examples of the present patent application. The maximal values of Dh, D10, D50, D90, D99 may each be selected in the examples of the present patent application.

Method of Preparation

The invention also relates to a process for producing the cerium based particles described above, comprising the following steps:

- (a) contacting, under an inert atmosphere, an aqueous solution of a base and an aqueous solution comprising $NO^{3-}$, $Ce^{III}$, optionally $Ce^{IV}$, optionally $M^{n+}$ with M a metal of valence n, wherein the difference between the base/total (Ce+optional M) molar ratio and the $NO^{3-}/Ce^{III}$ molar ratio is lower than 2;
- (b) subjecting the mixture obtained in step (a) to a thermal treatment, wherein the temperature is comprised between 55 and 75° C.;
- (c) optionally acidifying the mixture obtained in step (b);
- (d) optionally washing with water the solid material obtained at the end of step (b) or (c);
- (e) optionally subjecting the solid material obtained at the end of step (d) to a mechanical treatment to deagglomerate the particles.

Step (a)

Cerium III is provided by a salt which may be cerium III nitrate. Cerium IV, if present, is provided by a salt which may be cerium IV nitrate or cerium ammonium nitrate. $M^{n+}$ ions, if present, are provided by a salt which may be a metal M nitrate. In particular when $M^{n+}$ is $La^{3+}$, the salt may be lanthanum nitrate. $NO^{3-}$ ions are provided by one or more of these salts and optionally by addition of nitric acid. The molar ratio $NO^{3-}/Ce^{III}$ may be comprised between 1/3 and 5, in particular 1 and 4. The acidity of the aqueous solution used in step (a) is preferably comprised between 0.8 N and 12.0 N. The aqueous solution used in step (a) may be prepared by simply mixing the different compounds with water, preferably deionized water.

It is advantageous to use salts and ingredients of a high purity. The purity of the salts may be at least 99.5 wt %, more particularly of at least 99.9 wt %.

Step (a) consists in reacting the aqueous solution with an aqueous solution of a base. Products of the hydroxide type can in particular be used as base. Mention may be made of alkali metal or alkaline earth metal hydroxides and aqueous ammonia. Secondary, tertiary or quaternary amines can also be used. The aqueous solution of the base can also be degassed beforehand by bubbling with an inert gas. Step (a) may be carried by introducing the aqueous solution into an aqueous solution of the base. Step (a) is preferably carried out under an inert atmosphere, notably either in a closed reactor or in a semi-closed reactor with sweeping with the inert gas. The bringing into contact is generally carried out in a stirred reactor.

The process of preparation of the cerium-based particles of the invention is inter alia characterized by the fact that the difference between the base/total (Ce+optional M) molar ratio and the $NO_3^-/Ce^{III}$ molar ratio in step (a) is lower than 2.0, in particular lower than 1.8, more particularly lower than 1.7, more particularly lower than 1.6, more particularly lower than 1.4, even more particularly lower than 1.2. It was observed that, when the difference between these two molar ratios is equal or above 2.0, no protrusions are formed on the surface of the particles. The difference between the base/total (Ce+optional M) molar ratio and the $NO_3^-/Ce^{III}$ molar ratio may be equal to or higher than 0.1, in particular equal to or higher than 0.5.

It has been observed that cerium IV may be advantageously introduced in the reaction medium in order to decrease the reaction time. When Cerium IV is present, the $Ce^{IV}$'/total Ce molar ratio may be advantageously comprised between 1/300000 and 1/50, in particular between 1/100000 and 1/50, in particular between 1/10000 and 1/100, in particular between 1/5000 and 1/1000, even more particularly between 1/3500 and 1/2500.

An aqueous ceric nitrate solution obtained by the reaction of nitric acid with a hydrated ceric oxide may be used in that respect. The ceric oxide is prepared conventionally by reaction of a solution of a cerous salt and of an aqueous ammonia solution in the presence of aqueous hydrogen peroxide to convert $Ce^{III}$ cations into $Ce^{IV}$ cations. It is also particularly advantageous to use a ceric nitrate solution obtained according to the method of electrolytic oxidation of a cerous nitrate solution as disclosed in FR 2570087. A solution of ceric nitrate obtained according to the teaching of FR 2570087 may exhibit an acidity of around 0.6 N.

According to another embodiment, cerium IV is not introduced in step (a) or in any other step of the process according to the invention.

The amount of free oxygen in the starting solution should be carefully controlled and minimized. To this end, the starting solution may be degassed by bubbling with an inert gas. The term "inert gas" or "inert atmosphere" is intended to mean an atmosphere or a gas free of oxygen, it being possible for the gas to be, for example, nitrogen or argon.

Step (a) is generally carried out at a temperature comprised between 5° C. and 50° C. This temperature may be 20-25° C.

Step (b)

Step (b) is a thermal treatment of the reaction medium obtained at the end of the preceding step. It consists in (i) a heating substep and (ii) in an aging substep. The process of preparation of the cerium-based particles of the invention is also characterized by the fact that the heating substep (i) consists in heating the medium at a temperature which is comprised between 55° C. and 75° C., more particularly between 60° C. and 70° C., even more particularly between 65° C. and 70° C. It was observed that a too high temperature leads to particles having a smooth surface instead of the targeted protrusions. The aging substep (ii) consists in maintaining the medium at a temperature comprised between 55° C. and 75° C., more particularly between 60° C. and 70° C., even more particularly between 65° C. and 70° C. The duration of the aging substep (ii) may be between 2 hours to 20 hours.

During step (b), the oxidation of $Ce^{11}l$ to $Ce^{iv}$ occurs. In this step, the heating substep (i) is preferably carried out under an inert atmosphere. The inert atmosphere conditions described in connection with step (a) apply similarly. To promote the oxidation of $Ce^{III}$ the aging substep (ii) is then preferably not carried out under an inert atmosphere. Similarly the thermal treatment may be carried out in a stirred reactor.

Step (c)

In step (c), the mixture obtained at the end of step (b) may optionally be acidified. This step (c) may be performed by using a suitable acid such as nitric acid, picolinic acid, propionic acid, hydrochloric acid, sulfonic acid, carbonic acid, and mixtures thereof, preferably nitric acid. The reaction mixture may be acidified to a pH lower than 3.0, more particularly comprised between 1.5 and 2.5.

Step (d)

In step (d), the solid material obtained at the end of step (b) or step (c) may optionally be washed with water, preferably deionized water. When both performed, steps (c) and (d) may be performed in any order. This operation makes it possible to decrease the amount of residual anions, especially nitrates, in the dispersion and to obtain the targeted conductivity. This step may be carried out by filtering the solid from the mixture and redispersing the solid in water. Filtration and redispersion may be performed several times if necessary.

Step (e)

In step (e), the solid material obtained at the end of step (d) may optionally be subjected to a mechanical treatment to deagglomerate the particles. The step may be carried out by a double jet treatment or ultrasonic deagglomeration. This step usually leads to a sharp particle size distribution and to a reduction of the number of large agglomerated particles. According to an embodiment, the cerium-based particles have been subjected to the mechanical treatment of deagglomeration. According to another embodiment, the cerium-based particles have not been subjected to the mechanical treatment of deagglomeration.

After step (e), the solid material may be dried to obtain the cerium-based particles in the powder form. After step (e), water or a mixture of water and a miscible liquid organic compound may also be added to obtain the dispersion of the cerium-based particles in a liquid medium. The pH of the dispersion may also be adjusted at a value typically comprised between 4 and 6.

Dispersion of the Cerium-Based Particles

The dispersion comprises the cerium-based particles of the invention and a liquid medium. The liquid medium may be water or a mixture of water and a water-miscible organic liquid. The water-miscible organic liquid should not make the particles precipitate or agglomerate. The water-miscible organic liquid may for instance be an alcohol like isopropyl alcohol, ethanol, 1-propanol, methanol, 1-hexanol; a ketone like acetone, diacetone alcohol, methyl ethyl ketone; an ester like ethyl formate, propyl formate, ethyl acetate, methyl acetate, methyl lactate, butyl lactate, ethyl lactate. The proportion water/organic liquid may be between 80/20 to 99/1 (wt/wt).

The proportion of cerium-based particles in the dispersion may be comprised between 0.5 wt % and 40.0 wt %, this proportion being expressed as the weight of the cerium-based particles over the total weight of the dispersion. This proportion may be comprised between 10.0 wt % and 35.0 wt %.

The zeta potential of the cerium-based particles comprised in the dispersion of the invention is advantageously positive. It may be measured at a pH value of the dispersion comprised between 4 and 9.5. The zeta potential may be measured with a zetameter DT300 from Quantachrome on dispersions at 1% in weight.

The dispersion may also exhibit a conductivity lower than 300 μS/cm, more particularly lower than 150 μS/cm, even more particularly lower than 100 μS/cm or 50 μS/cm. The conductivity is measured with a conductimeter 9382-10D of HORIBA, Ltd.

Uses of the Cerium-Based Particles or of the Dispersion

The cerium-based particles of the invention or the dispersion of the invention may be used to prepare a polishing composition, more particularly a CMP composition. They may be used as a component of a polishing composition, more particularly a CMP composition.

A CMP composition (or chemical-mechanical polishing composition) is a polishing composition used for the selective removal of material from the surface of a substrate. It is used in the field of integrated circuits and other electronic devices. Indeed, in the fabrication of integrated circuits and other electronic devices, multiple layers of conducting, semiconducting, and dielectric materials are deposited onto or removed from the surface of a substrate. As layers of materials are sequentially deposited onto and removed from the substrate, the uppermost surface of the substrate may become non-planar and require planarization. Planarizing a surface (or "polishing") the surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization also is useful in forming features on a substrate by removing excess deposited material used to fill the features and to provide an even surface for subsequent levels of metallization and processing.

The substrate that can be polished with a polishing composition or a CMP composition may be for instance a silicon dioxide-type substrates, glass, a semi-conductor or a wafer.

The polishing composition or the CMP composition usually contains different ingredients other than the cerium-based particles. The polishing composition may comprise one or more of the following ingredients:

- abrasive particles other than the cerium-based particles (herein referred to as "additional abrasive particles"); and/or
- a pH regulator; and/or
- a surfactant; and/or
- a rheological control agent, including viscosity enhancing agents and coagulants; and/or
- an additive selected from an anionic copolymer of a carboxylic acid monomer, a sulfonated monomer, or a phosphonated monomer, and an acrylate, a polyvinylpyrrolidone, or a polyvinylalcohol (e.g., a copolymer of 2-hydroxyethylmethacrylic acid and methacrylic acid); a nonionic polymer, wherein the nonionic polymer is polyvinylpyrrolidone or polyethylene glycol; a silane, wherein the silane is an amino silane, an ureido silane, or a glycidyl silane; an N-oxide of a functionalized pyridine (e.g. picolinic acid N-oxide); a starch; a cyclodextrin (e.g., alpha-cyclodextrin or beta-cyclodextrin), and combinations thereof.

The pH of the polishing composition is generally comprised between 1 and 6. Typically, the polishing composition has a pH of 3.0 or greater. Also, the pH of the polishing composition typically is 6.0 or less.

The invention thus also relates to a method of removing a portion of a substrate, comprising polishing the substrate with a polishing composition such as described above.

The invention finally relates to a semiconductor polished by this method.

EXAMPLES

Example 1

A cerium nitrate solution was prepared by mixing 13.8 kg of trivalent cerium nitrate at 2.9 mol/L (density 1.7 kg/L), 4.2 kg of 68 wt % $HNO_3$ and 0.5 kg of deionized water. This solution was put into 20 L semi-closed vessel.

An ammonia aqueous solution was prepared by adding 8.8 kg of ammonia water at 14.3 mol/L (density 0.9 kg/L) and 79 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total Ce—$NO_3^-/Ce^{III}$=1.1) The temperature of the reaction mixture was heated up to 67° C. in approximately 1 hour and maintained for approximately 6.5 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of $CeO_2$. The BET specific surface area determined by nitrogen adsorption was 23.1 $m^2$/g.

The dispersion was observed by SEM. The primary particles were monodispersed and the average size was about 54 nm. SEM picture is reported in FIG. 1.

The hydrodynamic mean diameter Dh determined by dynamic light scattering (DLS) was 204 nm.

The secondary particle size was measured at relative refractive index 1.7 of $CeO_2$ in the water by laser particle sizer (Horiba LA-910). The median size D50 was 146 nm. The D10, D50 and D90 were 106, 146 and 226 nm, respectively. The calculated dispersion σ/m was 0.41.

Example 2

A cerium nitrate solution was prepared by mixing 13.6 kg of trivalent cerium nitrate solution at 2.9 mol/L (density 1.7 kg/L), 8.4 kg of 68 wt % $HNO_3$ solution and 0.2 kg of deionized water. This solution was put into 20 L semi-closed vessel.

An ammonia aqueous solution was prepared by adding 11.6 kg of ammonia water at 14.4 mol/L (density 0.9 kg/L) and 73 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total Ce—$NO_3^-/Ce^{III}$=1.1)

The temperature of the reaction mixture was heated up to 67° C. in approximately 1 hour and maintained for approximately 4.5 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of $CeO_2$. The BET specific surface area determined by nitrogen adsorption was 41.2 $m^2/g$.

The dispersion was observed by SEM. The primary particles were monodispersed and the average size was about 60 nm. SEM picture is reported in FIG. 2.

The hydrodynamic mean diameter Dh determined by dynamic light scattering (DLS) was 92 nm.

The secondary particle size was measured at relative refractive index 1.7 of $CeO_2$ in the water by laser particle sizer (Horiba LA-910). The median size D50 was 81 nm.

The D10, D50 and D90 were 67, 81 and 96 nm, respectively. The calculated dispersion σ/m was 0.18.

Example 3

A cerium nitrate solution was prepared by mixing 13.6 kg of trivalent cerium nitrate solution at 3.0 mol/L (density 1.7 kg/L), 2.1 kg of 68 wt % $HNO_3$ solution and 0.7 kg of deionized water. This solution was put into 20 L semi-closed vessel.

An ammonia aqueous solution was prepared by adding 7.3 kg of ammonia water at 14.4 mol/L (density 0.9 kg/L) and 82 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total Ce—$NO_3^-$/$Ce^{III}$=1.0) The temperature of the reaction mixture was heated up to 67° C. in approximately 1 hour and maintained for approximately 10 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of $CeO_2$. The BET specific surface area determined by nitrogen adsorption was 23.1 $m^2/g$.

The dispersion was observed by SEM. The primary particles were monodispersed and the average size was about 79 nm. SEM picture is reported in FIG. 3.

The hydrodynamic mean diameter Dh determined by dynamic light scattering (DLS) was 139 nm.

The secondary particle size was measured at relative refractive index 1.7 of $CeO_2$ in the water by laser particle sizer (Horiba LA-910). The median size D50 was 96 nm.

The D10, D50 and D90 were 79, 96 and 123 nm, respectively. The calculated dispersion σ/m was 0.23.

Example 4

A cerium nitrate solution was prepared by mixing about 8 g of tetravalent cerium nitrate solution at 1.5 mol/L (density 1.7 kg/L), 13.8 kg of trivalent cerium nitrate solution at 2.9 mol/L (density 1.7 kg/L), 4.2 kg of 68 wt % $HNO_3$ solution and 0.6 kg of deionized water.

This solution was put into 20 L semi-closed vessel.

An ammonia aqueous solution was prepared by adding 8.7 kg of ammonia water at 14.4 mol/L (density 0.9 kg/L) and 79 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total Ce—$NO_3^-$/$Ce^{III}$=1.1) The temperature of the reaction mixture was heated up to 67° C. in approximately 1 hours and maintained for approximately 3.5 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of $CeO_2$. The BET specific surface area determined by nitrogen adsorption was 27.5 $m^2/g$.

The dispersion was observed by SEM. The primary particles were monodispersed and the average size was about 58 nm.

The hydrodynamic mean diameter Dh determined by dynamic light scattering (DLS) was 105 nm.

The secondary particle size was measured at relative refractive index 1.7 of $CeO_2$ in the water by laser particle sizer (Horiba LA-910). The median size D50 was 84 nm.

The D10, D50 and D90 were 68, 84 and 97 nm, respectively. The calculated dispersion σ/m was 0.17.

Example 5

A cerium nitrate solution was prepared by mixing 13.7 kg of trivalent cerium nitrate solution at 2.9 mol/L (density 1.7 kg/L), 3.1 kg of 68 wt % $HNO_3$ solution and 0.8 kg of deionized water. This solution was put into 20 L semi-closed vessel.

An ammonia aqueous solution was prepared by adding 8.8 kg of ammonia water at 14.4 mol/L (density 0.9 kg/L) and 79 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total Ce—$NO_3^-$/$Ce^{III}$=1.6)

The temperature of the reaction mixture was heated up to 70° C. in approximately 1 hour and maintained for approximately 10 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of $CeO_2$. The BET specific surface area determined by nitrogen adsorption was 19.3 $m^2/g$.

Figure 4:
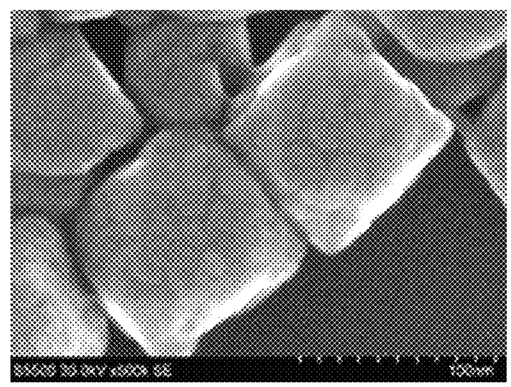

The dispersion was observed by SEM. The primary particles were monodispersed and the average size was about 99 nm. SEM picture is reported in FIG. 4.

The hydrodynamic mean diameter Dh determined by dynamic light scattering (DLS) was 152 nm.

The secondary particle size was measured at relative refractive index 1.7 of $CeO_2$ in the water by laser particle sizer (Horiba LA-910). The median size D50 was 116 nm. The D10, D50 and D90 were 93, 116 and 152 nm, respectively. The calculated dispersion σ/m was 0.25.

Example 6

A cerium nitrate solution was prepared by mixing 13.8 kg of trivalent cerium nitrate solution at 2.9 mol/L (density 1.7 kg/L), 0.36 kg of lanthanum nitrate solution at 2.9 mol/L (density 1.7 kg/L), 4.3 kg of 68 wt % $HNO_3$ solution and 0.3 kg of deionized water. This solution was put into 20 L semi-closed vessel.

An ammonia aqueous solution was prepared by adding 9 kg of ammonia water at 14.3 mol/L (density 0.9 kg/L) and 79 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total (Ce+La)—$NO_3^-/Ce^{III}$=0.93)

The temperature of the reaction mixture was heated up to 67° C. in approximately 1 hour and maintained for approximately 10 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of mixed oxide Ce/La. The BET specific surface area determined by nitrogen adsorption was 32.6 $m^2/g$.

The dispersion was observed by SEM. The primary particles were monodispersed and the average size was about 104 nm. SEM picture is reported in FIG. 5.

The hydrodynamic mean diameter Dh determined by dynamic light scattering (DLS) was 156 nm.

The secondary particle size was measured at relative refractive index 1.7 of $CeO_2$ in the water by laser particle sizer (Horiba LA-910). The median size D50 was 113 nm. The D10, D50 and D90 were 96, 113 and 142 nm, respectively. The calculated dispersion σ/m was 0.20.

Example 7: Detachment Test

Figure 11:
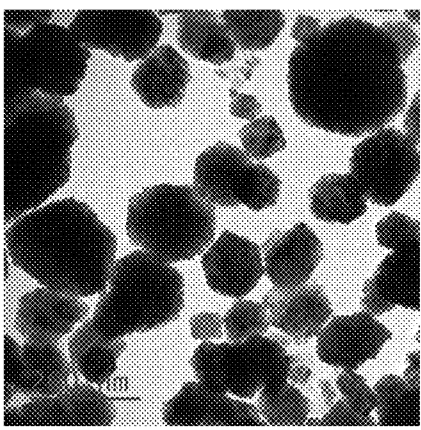
FIG. 11 is a TEM picture of the particles prepared in example 1 after the application of ultrasound as detailed in example 7.

A 30 mL glass container containing 10 mL of the dispersion at 10 wt % in $CeO_2$ prepared in example 1 was used. Ultrasound was performed for 5 min directly in the glass container, at 90% of power, with an Ultrasound system: 1500 W generator type Sonics Vibracell VC1500/VCX1500 equipped with Converters CV154+Boosters (Part No: BHNVC21)+19 mm Probe (Part No: 630-0208). As it can be seen on FIG. 11, no significant detachment of the protrusions from the particles was observed.

Comparative Example 1

A cerium nitrate solution was prepared by mixing about 0.3 g of tetravalent cerium nitrate solution at 1.5 mol/L (density 1.7 kg/L), 13.9 kg of trivalent cerium nitrate solution at 2.9 mol/L (density 1.7 kg/L), 2.1 kg of 68 wt % $HNO_3$ solution and 0.5 kg of deionized water ($Ce^{IV}$/total Ce molar ratio=1/80000). This solution was put into 20 L semi-closed vessel. An ammonia aqueous solution was prepared by adding 9.3 kg of ammonia water at 14.5 mol/L (density 0.9 kg/L) and 90 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling (molar ratios $NH_4OH$/total Ce—$NO_3^-/Ce^{III}$=2.4).

The temperature of the reaction mixture was heated up to 80° C. in approximately 1 hour and maintained for approximately 4 hours at the same conditions of agitation without $N_2$ bubbling.

The reaction mixture was cooled and acidified at pH 2 with 68 wt % $HNO_3$. The reaction mixture was filtered and washed with deionized water. The washing was repeated when the conductivity of washing solution was less 0.05 mS/cm. The suspension obtained finally was deagglomerated and adjusted at 10% of $CeO_2$.

Part of the dispersion was dried in an oven at 200° C., thereby obtaining a powder of $CeO_2$. The BET specific surface area determined by nitrogen adsorption was 12.9 $m^2/g$.

The suspension was observed by SEM. The primary particles were monodispersed and the size was about 140 nm. SEM picture is reported in FIG. 6.

The hydrodynamic mean diameter Dh determined by dynamic light scattering (DLS) was 153 nm.

The secondary particle size was measured at relative refractive index 1.7 of $CeO_2$ in the water by laser particle sizer (Horiba LA-910). The median size D50 was 109 nm. The D10, D50 and D90 were 91, 109 and 133 nm, respectively. The calculated dispersion σ/m was 0.19.

Comparative Example 2

A cerium nitrate solution was prepared by mixing about 0.30 g of tetravalent cerium nitrate solution at 1.5 mol/L (density 1.7 kg/L), 13.8 kg of trivalent cerium nitrate solution at 2.9 mol/L, 2.1 kg of 68 wt % $HNO_3$ solution and 0.5 kg of deionized water ($Ce^{IV}$/total Ce molar ratio=1/80000). This solution was put into 20 L semi-closed vessel.

An ammonia aqueous solution was prepared by adding 8.6 kg of ammonia water at 14.6 mol/L (density 0.9 kg/L) and 80 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min in the same conditions of agitation and $N_2$ bubbling (molar ratios $NH_4OH$/total Ce—$NO_3^-/Ce^{III}$=2.0).

The temperature of the reaction mixture was heated up to 67° C. in approximately 1 hours and maintained for approximately 14 hours at the same conditions of agitation without $N_2$ bubbling.

The reaction mixture was cooled and acidified at pH 2 with 68 wt % $HNO_3$. The reaction mixture was filtered and washed with deionized water. The washing was repeated when the conductivity of washing solution was less 0.05 mS/cm. The suspension obtained finally was deagglomerated and adjusted at 10% of $CeO_2$.

Part of the dispersion was dried in an oven at 200° C., thereby obtaining a powder of $CeO_2$. The BET specific surface area determined by nitrogen adsorption was 15.8 $m^2/g$.

The suspension was observed by SEM. The primary particles were monodispersed and the size was about 90 nm. SEM picture is reported in FIG. 7.

The hydrodynamic mean diameter Dh determined by dynamic light scattering (DLS) was 154 nm.

The secondary particle size was measured at relative refractive index 1.7 of $CeO_2$ in the water by laser particle sizer (Horiba LA-910). The median size D50 was 105 nm. The D10, D50 and D90 were 86, 105 and 134 nm, respectively. The calculated dispersion σ/m was 0.23.

Comparative Example 3

A cerium nitrate solution was prepared by mixing 13.8 kg of trivalent cerium nitrate at 2.9 mol/L (density 1.7 kg/L), 4.2 kg of 68 wt % $HNO_3$ and 0.5 kg of deionized water. This solution was put into 20 L semi-closed vessel.

An ammonia aqueous solution was prepared by adding 14.5 kg of ammonia water at 14.4 mol/L (density 0.9 kg/L) and 72 kg of deionized water. This solution was put into 100 L semi-closed reactor jacketed, and bubbled by $N_2$ gas with the agitation for 1 hour.

The above described cerium nitrate solution was mixed with the ammonia aqueous solution in approximately 30 min at ambient temperature and in the same conditions of agitation and $N_2$ bubbling. (molar ratios $NH_4OH$/total Ce—$NO_3^-/Ce^{III}$=5.1) The temperature of the reaction mixture was heated up to 67° C. in approximately 1 hours and maintained for approximately 6.5 hours at the same conditions of agitation without $N_2$ bubbling.

The reaction mixture was cooled and acidified at pH 2 with 68 wt % $HNO_3$. The reaction mixture was filtered and washed with deionized water. The washing was repeated until the conductivity of washing solution was less 0.05 mS/cm. The dispersion finally obtained was deagglomerated by using a double impact jet treatment machine and adjusted at 10% of $CeO_2$.

Part of the dispersion was dried in an oven at 200° C., thereby obtaining a powder of $CeO_2$. The BET specific surface area determined by nitrogen adsorption was 14.3 $m^2/g$.

The dispersion was observed by SEM. The primary particles were monodispersed and the size was about 110 nm. SEM picture is reported in FIG. 8.

The hydrodynamic mean diameter Dh determined by dynamic light scattering (DLS) was 162 nm.

The secondary particle size was measured at relative refractive index 1.7 of $CeO_2$ in the water by laser particle sizer (Horiba LA-910). The median size DSO was 115 nm.

The D10, DSO and D90 were 99, 115 and 145 nm, respectively. The calculated dispersion σ/m was 0.20.

Comparative Example 4

An attempt was made to prepare particles according to the experimental section of the document US 2015/0072522.

Stage 1: a cerium(III) salt and deionized water were mixed at a mixing ratio of 3:1, 2 kg of cerium(III) salt and 1.125 kg of deionized water to prepare a cerium(III) aqueous solution, and a cerium(IV) salt and deionized water were mixed at a mixing ratio of 1:1750, 2 g of cerium(IV) salt and 4.75 kg of deionized water to prepare a cerium(IV) aqueous solution. The cerium(IV) aqueous solution and a nitric acid were mixed at a mixing ratio of 50:1, 3 kg of the cerium(IV) solution and 2.55 kg of the nitric acid, to prepare a cerium (IV) mixture solution. Also, the cerium(III) aqueous solution and the cerium(IV) mixture solution were mixed to prepare a cerium mixture solution. Further, ammonia and deionized water were loaded at a mixing ratio of 1:6, 3 kg of ammonia and 25.5 kg of deionized water in a reaction container in an inert atmosphere and then stirred to prepare an alkaline aqueous solution. In a state that the cerium mixture solution was put in the reaction container and then stirred while maintaining the inert atmosphere, the cerium mixture solution was heated to 80° C. to perform a heat treatment for a time period of 2.5 hours. By performing the heat treatment as above, a solution containing an unprotruded mother particle was supposed to be obtained.

Stage 2: thereafter, this solution was cooled to a temperature of 30° C., and the ceria particle mixture solution and ammonia were put in a reaction container, mixed at a mixing ratio of 6:1, 54 kg of the ceria particle mixture solution and 7 kg of ammonia, and stirred for 6 minutes in an inert atmosphere. Then, a secondary cerium mixture solution in which 2.5 kg of a cerium(III) salt, 2.5 kg of a cerium(IV) salt, 5 kg of deionized water and 2.55 kg of a nitric acid were mixed was added to the ceria mixture solution to which ammonia was added, stirred, and heated to 80° C. to perform a heat treatment for 2.5 hours. By completing the heat treatment as above, a solution containing a primary auxiliary particle having a protrusion shape was supposed to be formed on a surface of the mother particle supposed to be obtained in stage 1.

Stage 3: stage 2 was repeated starting from the solution obtained at the end of stage 2. A solution containing a secondary auxiliary particle having a protrusion shape was supposed to be formed on a surface of the mother particle supposed to be prepared in stages 1 and 2.

Figure 12:
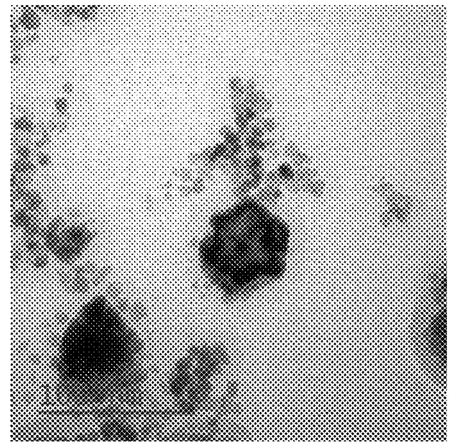
FIG. 12 is a TEM picture of the comparative particles prepared in comparative example 4.

Stage 4: this solution was cooled to room temperature to adjust pH of the solution to an acidic pH of 4 or less, thereby completing the reaction. The solution of which reaction was completed was left in room temperature to deposit the ceria particles, then deposition and washing using deionized water were repeated 2 times, and then centrifugation of the solution was performed to finally obtain the particles shown in FIG. 12.

As it can be seen on the picture, the mother particles and the auxiliary particles actually formed and grew up separately from each other. Such particles are not usable in a chemical mechanical polishing process as they would severely damage the substrate.

Conditions Used for Polishing

The dispersions of the cerium-based particles in water were tested under the following conditions. The polishing machine used is a Struers Tegramin. The surface to be polished is made of amorphous silica. The pad is cleaned with deionized water and then the sample is tested. The dispersion is introduced on the surface to be polished under a controlled flow-rate.

pressure applied on the head: 50N;

rotation speed: 150 rpm;

pad: neoprene (MD-Chem)—new pad for every dispersion tested;

flow-rate of the dispersion: 15 mL/min;

dispersion: the amount of cerium-based particles is 1 wt %;

the pH of the dispersion is 6-6.1, obtained by addition of diluted $NH_4OH$;

polishing time: 10 minutes.

The loss of weight of the substrate is recorded. The removal rate (RR) expressed in nm/min is then calculated as:

$$RR = \frac{\Delta m * 10^4}{\pi . R^2 . \rho . \Delta t}$$

wherein:

$\Delta m$ is the weight loss of the substrate;

R radius of the substrate;

$\rho$ density of the substrate;

$\Delta t$ polishing time.

The results are detailed in Table I. It can be seen that the removal rate/SEM size ratio is increased when using the particles of the present invention compared to smooth particles of the state of the art.

At the end of the polishing test, the polished substrates and the particles are visually inspected: it is confirmed that the protrusions of the cerium-based particles of the invention were not removed from the cerium-based particles during the polishing.

TABLE 1

Figure 2:
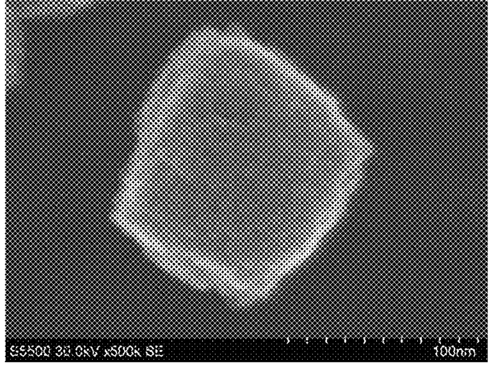
Figure 6:
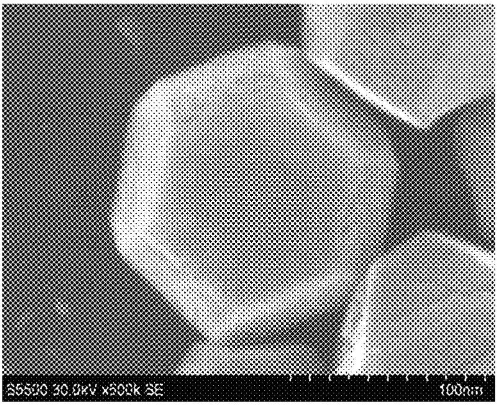
FIGS. 6 to 8 are SEM pictures of particles of cerium oxide respectively obtained by comparative examples 1 to 3.
Figure 7:
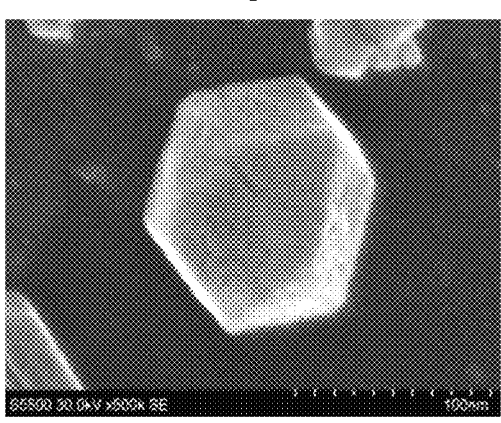
Figure 8:
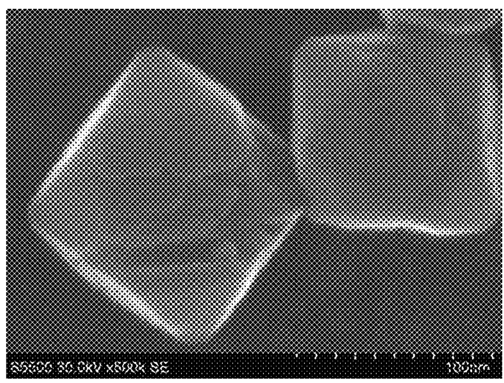

| | | particles | $Ce^{IV}$/total Ce (molar ratio) | difference base/total (Ce + M) − $NO_3^-/Ce^{III}$ (molar ratios) | reaction temperature (° C.) | SEM Size (nm) | SSA ($m^2$/g) | DLS Dh (mean) | Laser diffraction D10 (nm) | D50 (nm) | D90 (nm) | D99 (nm) | σ/m | particles shape (SEM) | protrusions (SEM) | Removal rate/SEM size (nm/min)/(nm) |
|---|---|---|---|---|---|---|---|---|---|---|---|---|---|---|---|---|
| Comparative examples | 1 | pure ceria | 1/80000 | 2.4 | 80 | 99 | 12.9 | 153 | 91 | 109 | 133 | 162 | 0.19 | FIG. 6 Polyhedral (truncated octahedron) | FIG. 6 No | 3.5 |
| | 2 | pure ceria | 1/80000 | 2.0 | 67 | 90 | 15.8 | 154 | 86 | 105 | 134 | 170 | 0.23 | FIG. 7 Polyhedral (truncated octahedron) | FIG. 7 No | NA |
| | 3 | pure ceria | 0 | 5.1 | 67 | 115 | 14.3 | 162 | 99 | 115 | 145 | 181 | 0.20 | FIG. 8 Polyhedral (cube) | FIG. 8 No | 3.9 |
| Examples | 1 | pure ceria | 0 | 1.1 | 67 | 54 | 23.1 | 204 | 106 | 146 | 226 | 367 | 0.41 | FIG. 1 Polyhedral (truncated octahedron) | FIG. 1 Yes | 6.0 |
| | 2 | pure ceria | 0 | 1.1 | 67 | 60 | 41.2 | 92 | 67 | 81 | 96 | 109 | 0.18 | FIG. 2 Polyhedral (cube) | FIG. 2 Yes | NA |
| | 3 | pure ceria | 0 | 1.0 | 67 | 79 | 23.1 | 139 | 79 | 96 | 123 | 155 | 0.23 | FIG. 3 Polyhedral (cube) | FIG. 3 Yes | 4.8 |
| | 4 | pure ceria | 1/3000 | 1.1 | 67 | 58 | 27.5 | 105 | 68 | 84 | 97 | 110 | 0.17 | N.A. Polyhedral (cube) | N.A. Yes | 4.5 |
| | 5 | pure ceria | 0 | 1.6 | 70 | 99 | 19.3 | 152 | 93 | 116 | 152 | 204 | 0.25 | FIG. 4 Polyhedral (cube) | FIG. 4 Yes | 4.4 |
| | 6 | Ce/La 97.5/2.5 | 0 | 0.93 | 67 | 104 | 32.6 | 156 | 96 | 113 | 142 | 171 | 0.20 | FIG. 5 Polyhedral (cube) | FIG. 5 Yes | 4.1 |

The invention claimed is:

1. Cerium based particles having substantially the shape of polyhedrons which have one or more faces with protrusions thereon, said protrusions being integrally formed with said cerium based particles, wherein the cerium based particles have a specific surface area (BET) between 16 and 55 $m^2$/g.

2. The cerium based particles according to claim 1, wherein the protrusions extend over at least 60% of the surface of said face.

3. The cerium based particles according to claim 1, wherein the protrusions are blunt.

4. The cerium based particles according to claim 1, having at least one edge portion and/or corner being substantially free from protrusions.

5. The cerium based particles according to claim 1, wherein said polyhedrons are cubes, truncated octahedrons or combinations thereof.

6. The cerium based particles according to claim 1, wherein said particles are made of cerium oxide or of a mixed oxide of cerium and at least one metal (M) chosen among lanthanum, praseodymium and neodymium.

7. The cerium based particles according to claim 6, wherein the particles made of a mixed oxide of cerium and at least one metal (M) have a molar ratio M/(M+Ce) between 0.01 and 0.15.

8. The cerium based particles according to claim 1, characterized by an hydrodynamic mean diameter Dh determined by dynamic light scattering between 75 nm and 1000 nm.

9. The cerium based particle according to claim 1, characterized by a median diameter D50 determined by laser diffraction between 70 nm and 200 nm.

10. The cerium based particle according to claim 1, characterized by a diameter D10 determined by laser diffraction between 55 nm and 200 nm.

11. The cerium based particle according to claim 1, characterized by a diameter D90 determined by laser diffraction between 80 nm and 300 nm.

12. The cerium based particle according to claim 1, characterized by a diameter D99 determined by laser diffraction between 90 nm and 400 nm.

13. The cerium based particle according to claim 1, characterized by a dispersion index σ/m lower than 0.60, wherein σ/m=(D90-D10)/2D50, D10, D50 and D90 being determined by laser diffraction.

14. The cerium based particle according to claim 1, characterized by a ratio D90/D50 between 1.10 and 1.60, D50 and D90 being determined by laser diffraction.

15. A dispersion of cerium based particles according to claim 1 in a liquid medium.

16. The dispersion according to claim 15 exhibiting a conductivity lower than 300 μS/cm.

17. A polishing composition comprising the cerium based particles according to claim 1 or a dispersion of the cerium based particles in a liquid medium wherein the dispersion of the cerium based particles optionally comprises one or more of the following ingredients: abrasive particles other than the cerium based particles according to claim 1; a pH regulator; a surfactant; a rheological control agent, including viscosity enhancing agents and coagulants; an additive selected from an anionic copolymer of a carboxylic acid monomer, a sulfonated monomer, or a phosphonated monomer, and an acrylate, a polyvinylpyrrolidone, or a polyvinylalcohol; a nonionic polymer, wherein the nonionic polymer is polyvinylpyrrolidone or polyethylene glycol; a silane, wherein the silane is an amino silane, an ureido silane, or a glycidyl silane; an N-oxide of a functionalized pyridine; a starch; a cyclodextrin, and combinations thereof.

18. A method of removing a portion of a substrate, the method comprising polishing the substrate with a polishing composition according to claim 17.

19. A process for producing the cerium based particles according to claim 1, comprising the following steps:

(a) contacting, under an inert atmosphere, an aqueous solution of a base and an aqueous solution comprising $NO_3^-$, $Ce^{III}$, optionally $Ce^{IV}$, optionally $M^{n+}$ with M a metal of valence n, wherein the difference between the base/total (Ce+optional M) molar ratio and the $NO_3^-/Ce^{III}$ molar ratio is lower than 2;

(b) subjecting the mixture obtained in step (a) to a thermal treatment, wherein the temperature is comprised between 55 and 75° C.;

(c) optionally acidifying the mixture obtained in step (b);

(d) optionally washing with water the solid material obtained at the end of step (b) or (c);

(e) optionally subjecting the solid material obtained at the end of step (d) to a mechanical treatment to deagglomerate the particles.

* * * * *